United States Patent
Yang et al.

(10) Patent No.: US 10,348,544 B2
(45) Date of Patent: Jul. 9, 2019

(54) METHOD AND DEVICE FOR CONTROLLING POWER IN MULTI-CARRIER COMMUNICATION SYSTEM

(71) Applicant: Samsung Electronics Co., Ltd., Suwon-si, Gyeonggi-do (KR)

(72) Inventors: Hayoung Yang, Yongin-si (KR); Seijoon Shim, Suwon-si (KR); Jonghyeuk Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/546,907

(22) PCT Filed: Jan. 27, 2016

(86) PCT No.: PCT/KR2016/000876
§ 371 (c)(1),
(2) Date: Jul. 27, 2017

(87) PCT Pub. No.: WO2016/122204
PCT Pub. Date: Aug. 4, 2016

(65) Prior Publication Data
US 2018/0278452 A1  Sep. 27, 2018

(30) Foreign Application Priority Data

Jan. 28, 2015 (KR) .................. 10-2015-0013745

(51) Int. Cl.
*H04B 1/00* (2006.01)
*H04L 5/00* (2006.01)
*H04L 27/26* (2006.01)

(52) U.S. Cl.
CPC ....... *H04L 27/2614* (2013.01); *H04B 1/0071* (2013.01); *H04L 5/001* (2013.01); *H04L 27/2618* (2013.01)

(58) Field of Classification Search
CPC ............ H04L 27/2623; H04L 27/2624; H04L 27/2614; H04L 27/2618
See application file for complete search history.

(56) References Cited

U.S. PATENT DOCUMENTS 9,203,654 B2 * 12/2015 Terry .................. H04L 25/0204
9,485,129 B1 * 11/2016 Cope .................... H04L 27/2623
(Continued)

FOREIGN PATENT DOCUMENTS

KR  10-2000-0074720 A  12/2000
KR  10-2008-0004918 A  1/2008
(Continued)

*Primary Examiner* — Khanh C Tran
(74) *Attorney, Agent, or Firm* — Jefferson IP Law, LLP

(57) ABSTRACT

Provided is a power control method of a transmitter. The method may include: generating a first aggregated carrier signal by aggregating multiple carrier signals; determining whether at least one peak exceeding a preset threshold is detected among the peaks of the first aggregated carrier signal; generating, if at least one peak exceeding the preset threshold is detected, at least one cancellation signal based on the detected at least one peak; and mapping the at least one cancellation signal to reserved subcarriers. It is possible to reduce the PAPR at the side of an amplifier by applying a tone reservation technique to multicarrier signals.

19 Claims, 12 Drawing Sheets

(56) References Cited

U.S. PATENT DOCUMENTS

| | | | |
|---|---|---|---|
| 2005/0249110 A1 | 11/2005 | Huo et al. | |
| 2006/0072524 A1* | 4/2006 | Perahia | H04L 25/022 370/338 |
| 2008/0298490 A1 | 12/2008 | Yun et al. | |
| 2009/0285194 A1 | 11/2009 | Kim et al. | |
| 2010/0002802 A1 | 1/2010 | Choo et al. | |
| 2010/0067615 A1* | 3/2010 | Dorpinghaus | H04L 27/2618 375/295 |
| 2010/0118994 A1 | 5/2010 | Park et al. | |
| 2010/0177847 A1 | 7/2010 | Woodward | |
| 2011/0235760 A1 | 9/2011 | Yu et al. | |
| 2012/0140836 A1 | 6/2012 | Helard et al. | |
| 2012/0257690 A1 | 10/2012 | Li | |
| 2013/0094345 A1* | 4/2013 | Woodward | H04L 27/2628 370/210 |
| 2014/0044215 A1 | 2/2014 | Mundarath et al. | |
| 2014/0362951 A1* | 12/2014 | Fehri | H04L 27/2623 375/297 |

FOREIGN PATENT DOCUMENTS

| | | |
|---|---|---|
| KR | 10-2008-0106834 A | 12/2008 |
| KR | 10-1117508 B1 | 3/2012 |
| KR | 10-2013-0050375 A | 5/2013 |
| KR | 10-1314254 B1 | 10/2013 |
| KR | 10-1343407 B1 | 12/2013 |
| KR | 10-1347480 B1 | 1/2014 |
| KR | 10-2014-0048055 A | 4/2014 |
| KR | 10-2014-0052924 A | 5/2014 |
| KR | 10-1394103 B1 | 5/2014 |

* cited by examiner

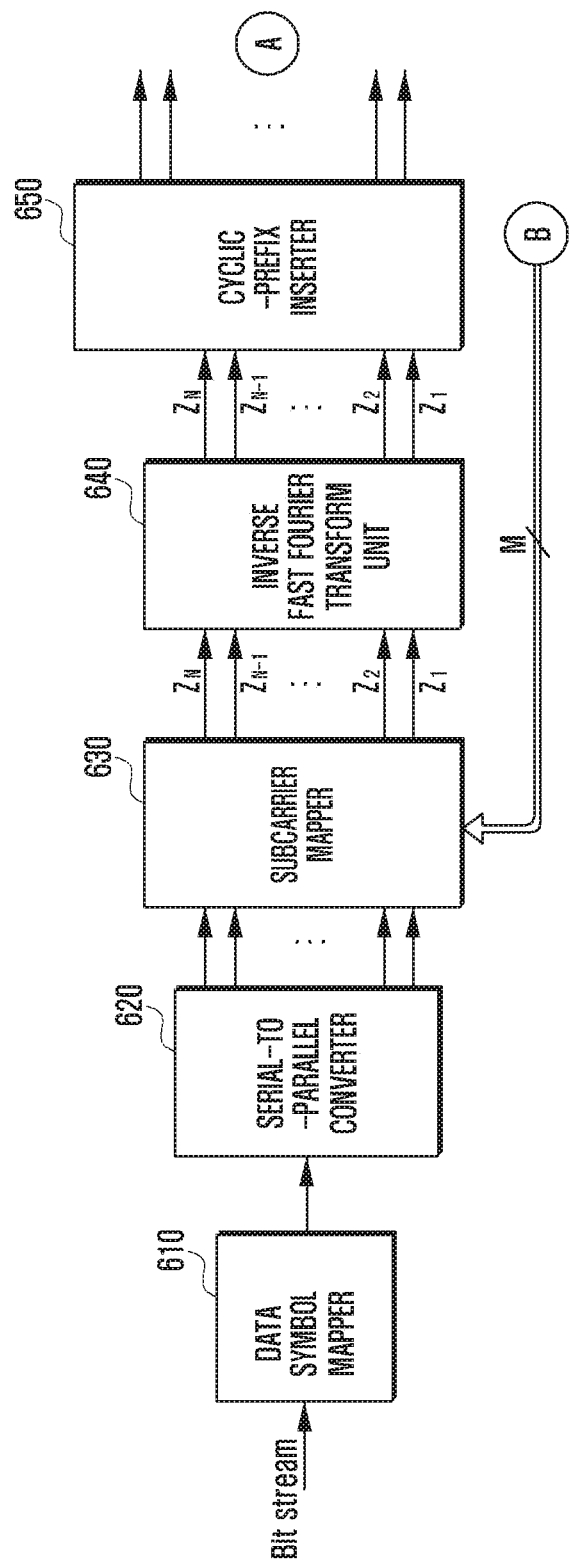

METHOD AND DEVICE FOR CONTROLLING POWER IN MULTI-CARRIER COMMUNICATION SYSTEM

TECHNICAL FIELD

The present invention relates to a method and apparatus for controlling power in a multicarrier communication system and, more particularly, to a method and apparatus for controlling the peak-to-average power ratio (PAPR) of the transmitter.

BACKGROUND ART

Multicarrier modulation techniques such as orthogonal frequency division multiplexing (OFDM) are being used for wired and wireless communication (e.g. WiMAX or LTE) in local area networks or cellular networks. In general, multicarrier modulated symbols may be divided into subcarriers (also known as tones) that occupy a smaller frequency band in the frequency spectrum. It is possible to transmit and receive data to and from one or more sources (e.g., users) via the subcarriers.

The peak-to-average power ratio (PAPR) refers to the square of the peak value divided by the square of the RMS value. OFDM transmission is a technique capable of efficiently transmitting a large amount of data using many orthogonal subcarriers. The PAPR for the OFDM symbol can be expressed as Equation 1:

$$PAPR = \frac{\max_{n=1}^{N}(|z_n|^2)}{\frac{1}{N}\sum_{n=1}^{N}|z_n|^2} \quad \text{Equation 1}$$

In Equation 1, $z_n$ is the $n^{th}$ sample of an OFDM symbol z, and the max function of the numerator determines the maximum value of $|z_n|^2$ for $n=1, \ldots, N$.

The OFDM transmission scheme is vulnerable to the PAPR because it uses multiple carriers. For example, if an OFDM symbol has a large PAPR, distortion may occur in the power amplification stage of the amplifier. One or more relatively large samples of an OFDM symbol may require the amplifier to be driven above the maximum output level. In addition, the input-output relationship of the amplifier may be nonlinear, causing nonlinear distortion of the OFDM symbol. When the maximum output level is reached, the amplifier typically clips the input sample and places an upper limit so that the maximum output level is not exceeded, which can cause another nonlinear distortion of the output signal. Nonlinear distortion affects the quality of the signal and, as a result, the receiver may have difficulty in recovering the transmitted data.

A number of schemes may be used to reduce the effects of nonlinear distortion by the amplifier or to eliminate nonlinear distortion.

First, the transmitter can use an amplifier capable of outputting higher power levels. That is, the amplifier with a large output range may operate with a significant backoff (upper margin) to ensure that it remains in the linear operating range even when a peak signal occurs. However, using an amplifier having a large output range is inefficient in terms of cost.

As another scheme, the transmitter may be configured to perform amplification in multiple stages to achieve the desired output level. In this scheme, each stage includes an amplification step and a filtering step. In the amplification step, relatively small clipping is performed on peak samples of each OFDM symbol. In the filtering step, each OFDM symbol is filtered to reduce distortion and sidelobes caused by clipping. This clipping and filtering process may be repeated until the desired amplification level is reached. By amplifying the signal in a multistage manner, the amount of distortion can be reduced in comparison to an equivalent single-stage amplifier.

As another scheme, multiple pseudorandom scrambling sequences can be applied to the OFDM signal in the frequency domain (e.g., output subcarrier mapper). For example, the transmitter may select a scrambling sequence causing the lowest PAPR after IFFT processing. As the selected scrambling sequence is not known to the receiver, the scrambling sequence may be transmitted to the receiver via a different channel or may be detected by the receiver in a blind manner. In the blind manner, the receiver may compare all possible sequences to select the most probable sequence, increasing the complexity of the reception process.

As a peak cancellation scheme, tone reservation (TR) reduces the PAPR for each OFDM symbol by appropriately adjusting the cancellation signal (e.g. impulse signal) generated using reserved tones.

DISCLOSURE OF INVENTION

Technical Problem

Accordingly, an aspect of the present invention is to provide a method for improving system peak throughput performance at a low cost in a multicarrier communication system that controls the PAPR using a tone reservation technique.

Solution to Problem

In accordance with an aspect of the present invention, there is provided a method of power control for a transmitter. The method may include: generating a first aggregated carrier signal by aggregating multiple carrier signals; determining whether at least one peak exceeding a preset threshold is detected among the peaks of the first aggregated carrier signal; generating, if at least one peak exceeding the preset threshold is detected, at least one cancellation signal based on the detected at least one peak; and mapping the at least one cancellation signal to reserved subcarriers.

In accordance with another aspect of the present invention, there is provided an apparatus for transmitting and receiving signals. The apparatus may include: a transceiver configured to transmit and receive signals to and from a device; and a controller configured to generate a first aggregated carrier signal by aggregating multiple carrier signals, determine whether at least one peak exceeding a preset threshold is detected among the peaks of the first aggregated carrier signal, generate, if at least one peak exceeding the preset threshold is detected, at least one cancellation signal based on the detected at least one peak, and map the at least one cancellation signal to reserved subcarriers.

Advantageous Effects of Invention

In a feature of the present invention, for a multicarrier transmission system where multicarrier signals are mixed and transmitted through one amplifier, a tone reservation technique is applied to reduce the PAPR in the up-sampled intermediate frequency band. Thereby, PAPR reduction effects can be obtained in terms of the amplifier that actually transmits multiple carriers, and better performance can be obtained in terms of error vector magnitude (EVM) serving as a performance indicator of the amplifier.

BRIEF DESCRIPTION OF DRAWINGS

FIGS. 6A and 6B illustrate the configuration of an OFDM transmitter applying tone reservation to the up-sampled signal at the intermediate frequency.

MODE FOR THE INVENTION

Figure 1:
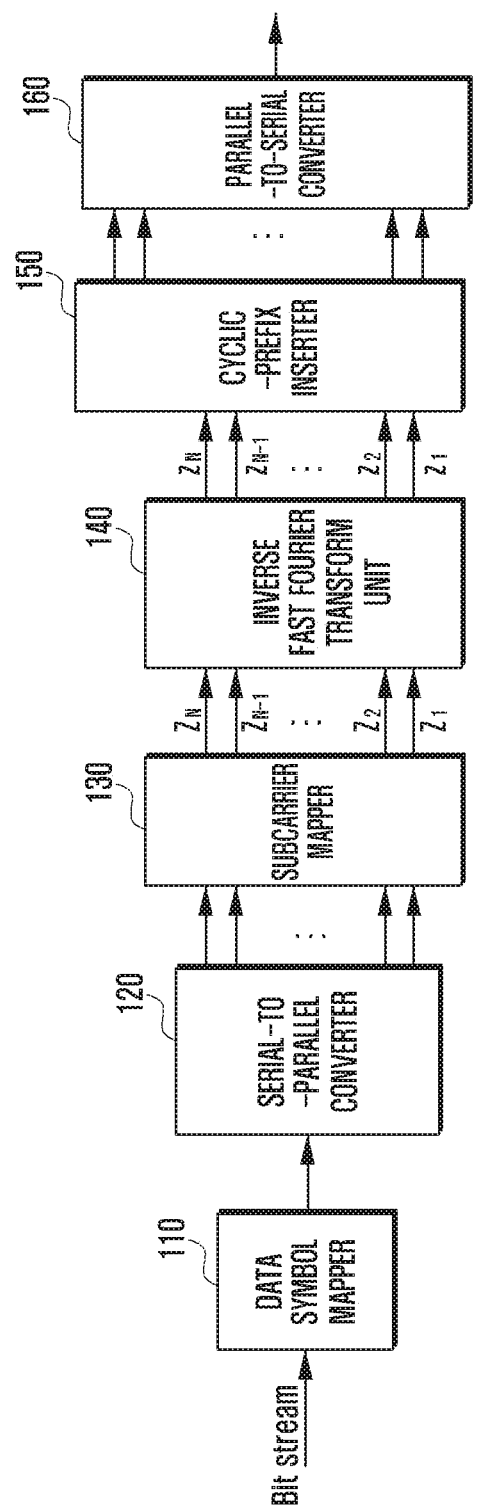
FIG. 1 illustrates the configuration of an OFDM transmitter.

It will be understood that the terms "comprising", "including", "having" and variants thereof used in the specification and claims, specify the presence of stated components and/or operations, but do not preclude the presence or addition of one or more other components and/or operations. In the specification and claims, the singular forms "a", "an" and "the" are intended to include the plural forms as well, unless the context clearly indicates otherwise. In the description, the word "unit", "module" or the like indicating a component or constituent may be given or used interchangeably in consideration of ease of specification only, but does not have a distinct meaning or role in itself.

Hereinafter, various embodiments of the present invention are described with reference to the accompanying drawings. In the following description, only portions required for understanding operations according to the embodiments of the present invention will be described, and descriptions of other portions will be simplified or omitted to avoid obscuring the subject matter of the present invention. The features of the present invention are not limited to the stated embodiments but may include all modifications, equivalents, and extensions thereof. In the drawings, some elements are exaggerated, omitted, or only outlined in brief, and thus may be not drawn to scale.

FIG. 1 illustrates the configuration of an OFDM transmitter.

With reference to FIG. 1, the OFDM transmitter may be configured to include a data symbol mapper 110, a serial-to-parallel (S/P) converter 120, a subcarrier mapper 130, an inverse fast Fourier transform (IFFT) unit 140, a cyclic-prefix inserter (CPI) 150, and a parallel-to-serial (P/S) converter 160.

The data symbol mapper 110 receives a serial bit stream of digital data, and maps the serial bit stream to data symbols, producing a serial stream of data symbols. The data symbol mapper 110 may use modulation schemes such as quadrature phase shift keying (QPSK) and quadrature amplitude modulation (QAM).

The S/P converter 120 converts a serial stream of data symbols from the data symbol mapper 110 into D parallel data streams. The subcarrier mapper 130 assigns the D parallel data streams to N subcarriers (tones). Here, the parallel data symbols are assigned to different subcarriers, and the N subcarrier frequencies are arranged orthogonally to each other. The number of subcarriers N may be an integer such as 512, 1024, 2048, or 4096. The number of subcarriers N may be equal to the sum of the number of data symbols D, the number of pilot symbols P, and the number of unused or free subcarriers U (N=D+P+U).

The IFFT unit 140 may convert N outputs (e.g. $Z = Z_1, \ldots, Z_N$) of the subcarrier mapper 130 into an OFDM symbol including N time-domain complex numbers (e.g. $z = z_1, \ldots, z_N$).

The cyclic-prefix inserter 150 inserts a cyclic prefix including C complex numbers into the OFDM symbol output by the IFFT unit 140. The cyclic prefix allows the receiver to overcome inter-symbol interference (ISI) of the signal caused by multipath reflections.

The P/S converter 160 converts N time-domain complex numbers and C cyclic-prefix complex numbers from the parallel format to the serial format.

Although not shown in FIG. 1, the OFDM transmitter may further include an encoding unit, a digital-to-analog converter, and an amplifier. The output signal of the encoding unit may be input to the data symbol mapper 110. The digital-to-analog converter and the amplifier may receive the output signal of the P/S converter 160 directly or indirectly.

In the OFDM transmitter, an OFDM symbol having a plurality of amplitude peaks can be generated when data symbols of the frequency domain are summed over subcarriers of the time domain. As the transmission data has variable characteristics, the size (height) of the peaks may be different within each OFDM symbol or between OFDM symbols. In addition, some of the peaks may cause a relatively large PAPR compared to the average amplitude level of OFDM symbols. Next, a method of controlling the PAPR using a tone reservation (TR) scheme will be described through various embodiments.

Figure 2:
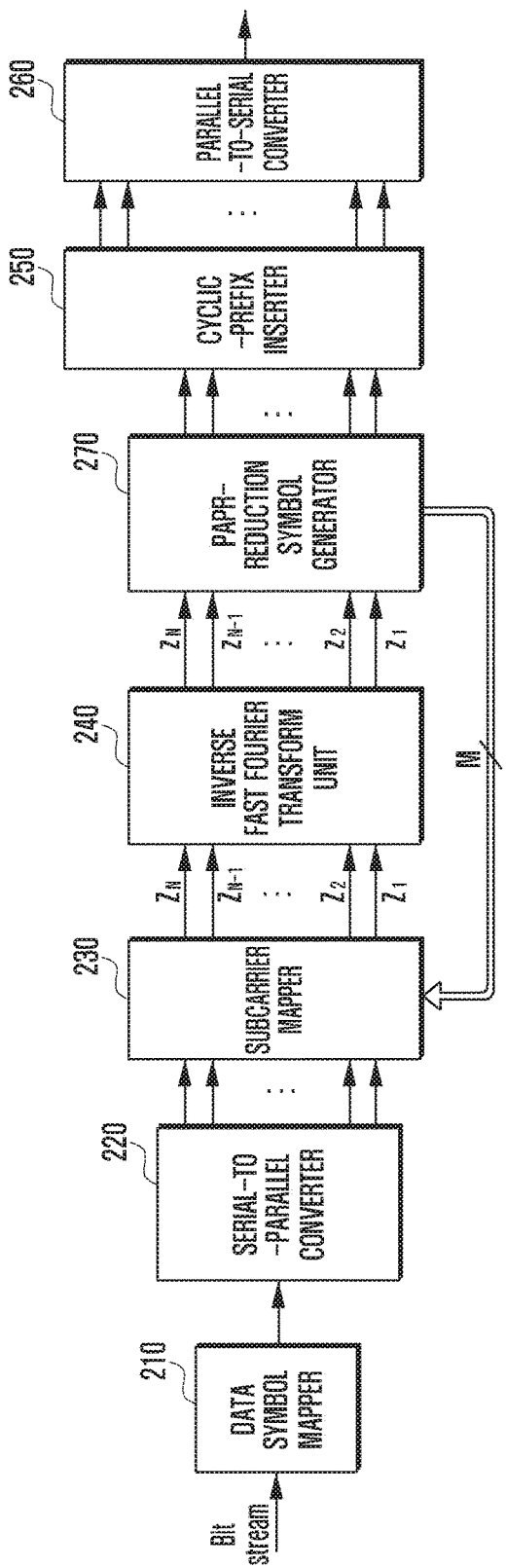
FIG. 2 illustrates the configuration of an OFDM transmitter using tone reservation.

FIG. 2 illustrates the configuration of an OFDM transmitter using tone reservation.

With reference to FIG. 1, the OFDM transmitter may be configured to include a data symbol mapper 210, a serial-to-parallel converter 220, a subcarrier mapper 230, an inverse fast Fourier transform (IFFT) unit 240, a PAPR-reduction symbol generator 270, a cyclic-prefix inserter 250, and a parallel-to-serial converter 260. The units in FIG. 2 can perform the same functions as those in FIG. 1, and functions different from those in FIG. 1 will be described below.

When the transmitter uses tone reservation to reduce the PAPR, the subcarrier mapper 230 may map PAPR-reduction symbols to M reserved subcarriers (tones) to which no data symbol is assigned. The number of subcarriers N (e.g. 1200) at the output of the subcarrier mapper 230 may be equal to the sum of the number of assigned data symbols D, the number of assigned pilot symbols P, the number of reserved subcarriers M (e.g. 36), and the number of unused subcarriers U (N=D+M+U+P).

The PAPR-reduction symbol generator 270 compares the magnitude of the PAPR of the received OFDM symbol z with a preset PAPR threshold. If the PAPR of the OFDM symbol z is less than the PAPR threshold, the OFDM symbol z received by the PAPR-reduction symbol generator 270 is directly transferred to the cyclic-prefix inserter 250. If the PAPR of the OFDM symbol z is greater than the PAPR threshold, the PAPR-reduction symbol generator 270 generates a set of M PAPR reduction symbols for peak cancellation and transfers the set to the subcarrier mapper 230. The subcarrier mapper 230 assigns the parallel data streams to the subcarriers (tones) by use of the set of PAPR reduction symbols. Then, the PAPR-reduction symbol generator 270 compares again the PAPR of the received OFDM symbol z with the preset PAPR threshold. This process may be repeated until the PAPR of the PAPR-reduced OFDM symbol z received by the PAPR-reduction symbol generator 270 becomes less than the PAPR threshold. If the PAPR of the PAPR-reduced OFDM symbol z is less than the PAPR threshold, the PAPR-reduced OFDM symbol z is transferred to the cyclic-prefix inserter 250.

Figure 3:
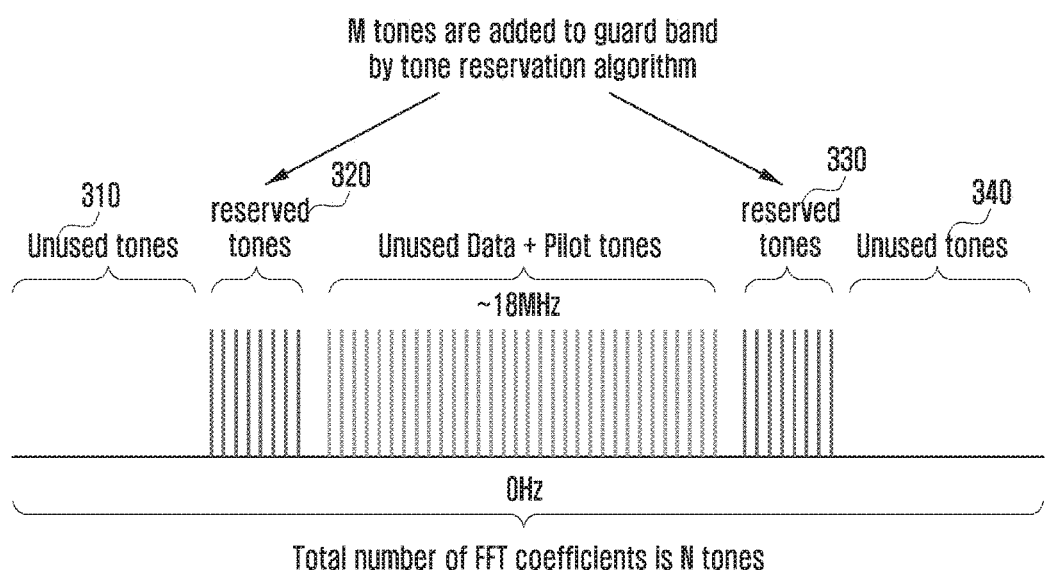
FIG. 3 depicts allocation of tones in the frequency domain when a tone reservation algorithm is applied.

FIG. 3 depicts allocation of tones in the frequency domain when a tone reservation algorithm is applied.

The effective bandwidth in the OFDM system may correspond to the entire fast Fourier transform (FFT) size or to only a portion of the FFT size. When symbols are assigned to only some of all tones for transmission as shown in FIG. 3, unused tones 310 and 340 exist. Such unused tones are mainly used as a guard band so as not to cause interference to the adjacent bands.

As shown in FIG. 3, in a data system changing in real time, reserved tones 320 and 330 are preferably included in the guard bands where no data symbols or pilot symbols are assigned. That is, by assigning PAPR-reduction symbols to the reserved tones, the peak values of the time-domain OFDM symbols can be reduced without affecting the data symbols or pilot symbols.

To select the PAPR-reduction symbols to be assigned to the reserved tones, an iterative combination search may be performed. For example, assume that the transmitter modulates data using 16-bit quadrature amplitude modulation (16-QAM) and reserves 8 tones for PAPR-reduction symbols. The transmitter may consider $16^8$ different combinations of PAPR-reduction symbols that can be assignable to the reserved tones of each OFDM symbol, and may select a combination of symbols with the lowest PAPR. Considering all possible combinations is the most flexible way, but it requires a lot of iterative computations and has a high complexity. Hence, to reduce the complexity, it is possible to consider an option of reducing the number of combinations by forming a subset of all the combinations in the form of a predefined bank.

On the other hand, to select the PAPR-reduction symbols to be assigned to the reserved tones, rather than obtaining tone-reserved symbols by selecting one of the candidate group combinations, the PAPR characteristics of the output signal of the IFFT unit may be monitored and PAPR-reduction symbols may be directly generated based on the PAPR characteristics.

Figure 4:
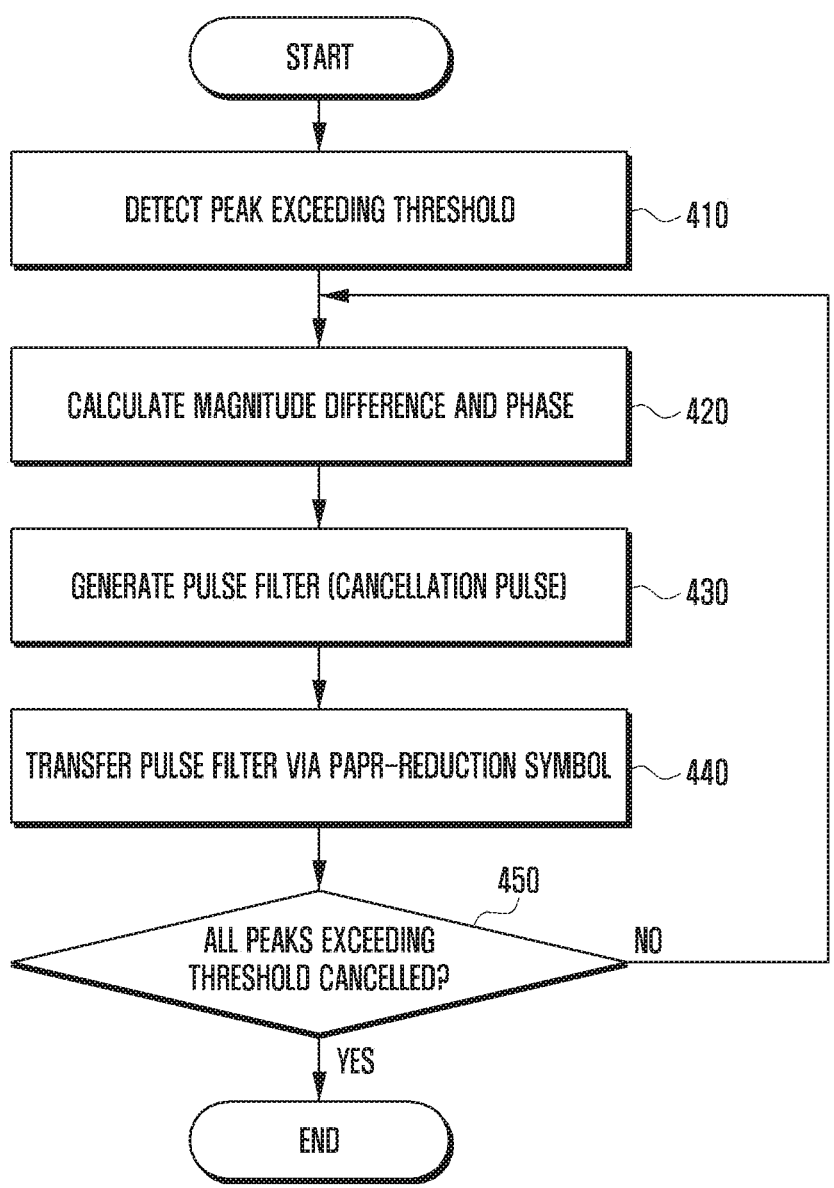
FIG. 4 is a flowchart for reducing peaks based on PAPR characteristics of the signal.

FIG. 4 is a flowchart for reducing peaks based on PAPR characteristics of the signal.

At step 410, the transmitter may detect peaks (or peak samples) exceeding the threshold in the output signal of the IFFT unit. At step 420, the transmitter may compare the threshold and the peak value of a detected peak to calculate the magnitude difference and the phase. At step 430, the transmitter may generate a pulse filter (cancellation pulse) from a basic pulse in consideration of the magnitude difference and phase. The basic pulse is a waveform prepared in advance in the form of an impulse by use of a tone-reserved symbol. The basic pulse can be, for example, a rectangular tone carried in the reserved region and may be used as a sync function in the time domain. To make the pulse filter match the position and phase in the time domain where a peak occurs, the pulse filter can be generated by applying a phase rotation corresponding to the time domain position to the rectangular tone of the frequency domain and multiplying the rectangular tone by a constant phase term. At step 440, the transmitter may transfer the pulse filter (cancellation pulse) to the subcarrier mapper via a PAPR-reduction symbol. As such, when the time domain output of the IFFT unit is observed, the corresponding peak sample is attenuated. At step 450, the transmitter may determine whether all peaks exceeding the threshold have been cancelled. Upon determining that all the peaks exceeding the threshold have been cancelled, the peak reduction procedure may be ended. Upon determining that there is a peak exceeding the threshold, the procedure returns to step 420 at which the transmitter may calculate the magnitude difference and phase with respect to the peak exceeding the threshold.

Figure 5:
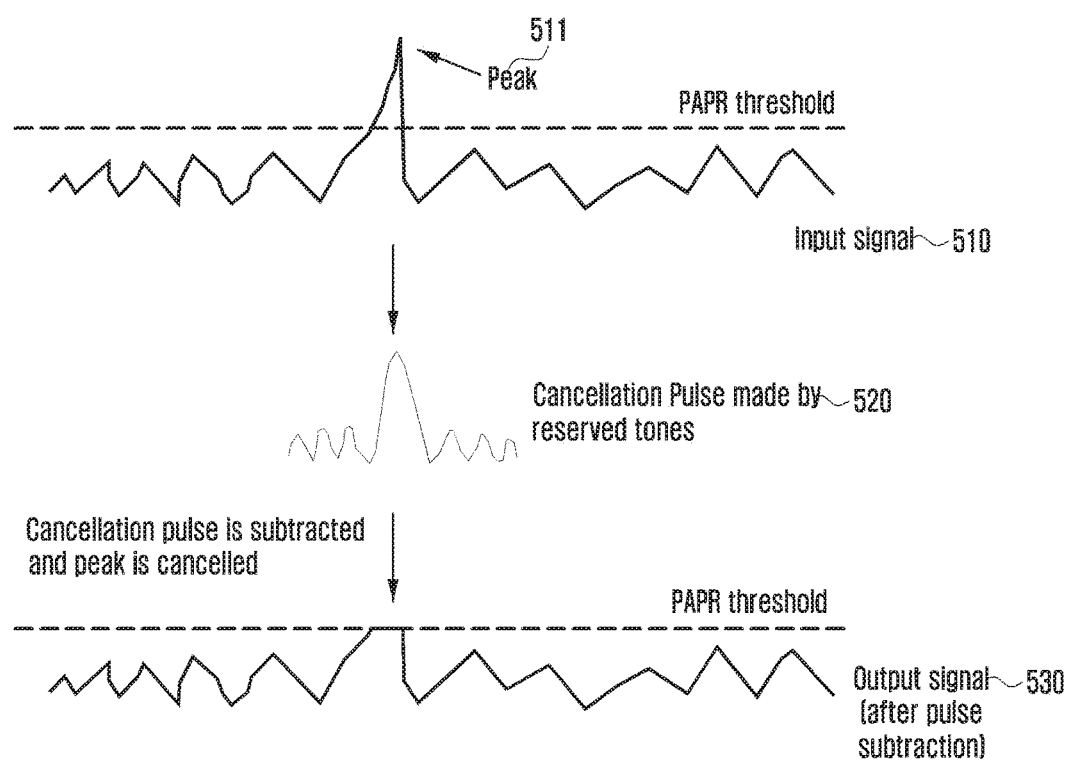
FIG. 5 depicts peak reduction based on PAPR characteristics of the signal.

FIG. 5 depicts peak reduction based on PAPR characteristics of the signal.

FIG. 5 shows an input signal 510, a cancellation pulse 520, and an output signal 530 in the time domain. The input signal 510 has a peak 511 higher than the threshold. When the cancellation pulse 520 produced by reserved tones is subtracted from the input signal 510, the output signal 530 is generated with the peak 511 removed.

The signal input to the digital-to-analog conversion (DAC) unit is generally not a baseband signal but an up-sampled or over-sampled signal having an intermediate frequency of superheterodyne transmission mode. Hence, it is necessary to actually reduce the PAPR in the up-sampled signal. Next, a description is given of applying the tone reservation technique to reduce the PAPR in an up-sampled signal at an intermediate frequency.

Figure 6B:
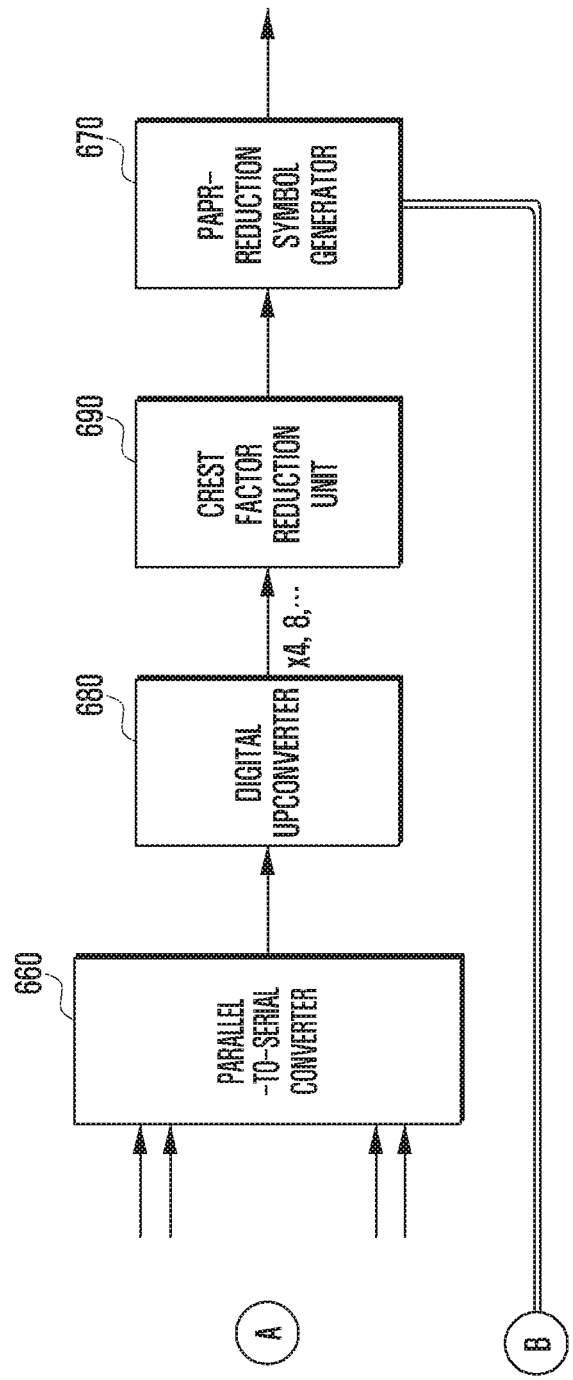

FIGS. 6A and 6B illustrate the configuration of an OFDM transmitter applying tone reservation to the up-sampled signal at the intermediate frequency.

With reference to FIGS. 6A and 6B, the OFDM transmitter may be configured to include a data symbol mapper 610, a serial-to-parallel converter 620, a subcarrier mapper 630, an inverse fast Fourier transform (IFFT) unit 640, a cyclic-prefix inserter 650, a parallel-to-serial converter 660, a digital upconverter (DUC) 680, a crest factor reduction (CFR) unit 690, and a PAPR-reduction symbol generator 670. The units in FIG. 6 can perform the same functions as those in FIG. 2, and functions different from those in FIG. 2 will be described below.

The digital upconverter 680 upconverts the frequency of digital data from a baseband frequency to an intermediate frequency.

The crest factor reduction (CFR) unit 690 detects peaks in the output signal of the digital upconverter 680 and reduces the peak exceeding the threshold among the detected peaks. The CFR function can be combined with the digital predistortion function used for amplifier linearization and removal of harmonic components due to frequency upconversion.

If the PAPR threshold is still exceeded after CFR operation is performed by the crest factor reduction unit 690, the PAPR-reduction symbol generator 670 may generate a PAPR-reduction symbol and deliver the same to the subcarrier mapper 630. Thereafter, the above operations may be repeated.

When the transmitter transmits multiple carrier signals, even if the PAPR is lowered for each carrier, the PAPR at the amplifier output signal may not be reduced at all. In this case, it is possible to apply a tone-reserved signal only to signals of carriers having a relatively large magnitude.

To reduce the PAPR of a signal in which all carriers are aggregated, it may be difficult to obtain the desired effect by multiplying each carrier by a weight for a signal whose sample signals have independent magnitudes and phase distributions without correlation therebetween (e.g., OFDM signal).

The OFDM transmitter may be physically divided into a baseband processing unit (modem chip) and a digital unit (DU). The digital unit upconverts the output signal of the baseband processing unit received through the common public radio interface (CPRI), and then performs subsequent operations. According to this classification, in FIG. 6, the data symbol mapper 610, the serial-to-parallel converter 620, the subcarrier mapper 630, the IFFT unit 640, the cyclic-prefix inserter 650, and the parallel-to-serial converter 660 may be included in the baseband processing unit, and the digital upconverter 680, the crest factor reduction unit 690, and the PAPR-reduction symbol generator 670 may be included in the digital unit. In a multicarrier transmission system, individual carrier signals are aggregated at an intermediate frequency after up-sampling. Next, for a multicarrier transmission system transmitting independent carrier signals, a description is given of a scheme for reducing the PAPR of the carrier signals combined in the intermediate frequency band after up-sampling instead of applying a tone reservation algorithm to the signal carried by each carrier. First, a description will be given of a scheme for examining the PAPR of an intermediate frequency band signal resulting from aggregation of all carrier signals and generating a tone-reserved symbol for each baseband signal to reduce the examined PAPR.

Figure 7:
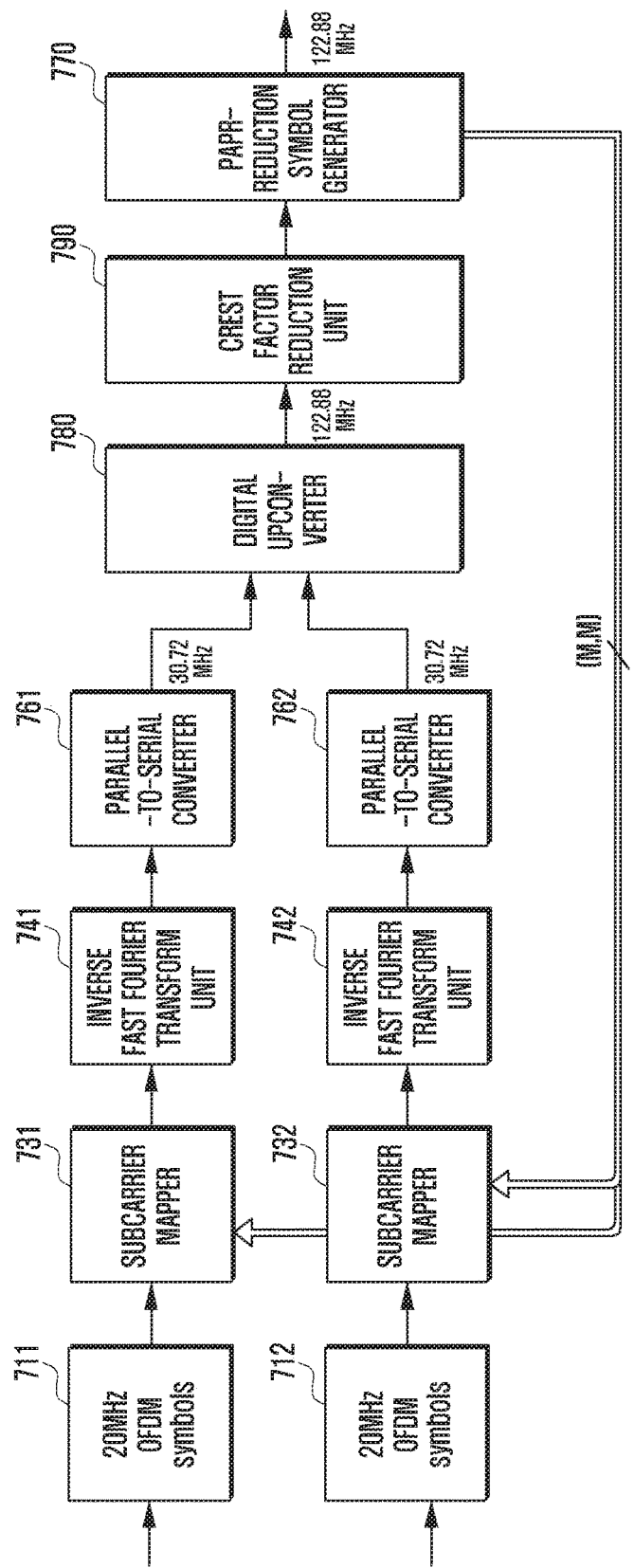
FIG. 7 illustrates the configuration of an OFDM transmitter applying tone reservation in a multicarrier transmission system.

FIG. 7 illustrates the configuration of an OFDM transmitter applying tone reservation in a multicarrier transmission system.

With reference to FIG. 7, the OFDM transmitter may be configured to include subcarrier mappers 731 and 732, inverse fast Fourier transform (IFFT) units 741 and 742, parallel-to-serial converters 761 and 762, a digital upconverter (DUC) 780, a crest factor reduction (CFR) unit 790, and a PAPR-reduction symbol generator 770. The above units of FIG. 7 can perform the same functions as those of FIGS. 6A and 6B, and some of the units shown in FIGS. 6A and 6B are omitted for convenience. Next, different features from those of FIGS. 6A and 6B will be described.

In FIG. 7, two OFDM signals 711 and 712 having a bandwidth of 20 MHz are shown. The sampling rate at the baseband stage is 30.72 MHz and the intermediate frequency is 122.88 MHz with 4 times up-sampling. The two signals with a bandwidth of 20 MHz (BW) are combined at the intermediate frequency to occupy a bandwidth of 40 MHz, and the transmission signal is a 122.88 MHz sampling signal. When the crest factor reduction unit 790 detects a peak of the output signal of the digital upconverter 780 and determines that the peak exceeds the threshold, the PAPR-reduction symbol generator 770 assigns a peak cancellation signal to the reserved tone. The reserved tone is transferred to the subcarrier mappers 731 and 732, and the IFFT and P/S operations are performed. The crest factor reduction unit 790 monitors the peaks of the intermediate frequency signal aggregated in the digital upconverter 780, and the PAPR-reduction symbol generator 770 assigns a peak cancellation signal to the reserved tone based on PAPR characteristics of the monitored peaks and transfers the reserved tone to the subcarrier mappers 731 and 732. Pulse filter generation for peak cancellation in the up-sampled intermediate frequency range may be performed according to the same rules as the baseband frequency range with the existing sampling rate. In addition, when the pulse filter generation rule is applied to two or more multicarrier systems, the same is true in that a peak is detected and a filter for cancelling the detected peak is generated. In this case, as the region allowing tone reservation increases in proportion to the number of carriers, the pulse filter can be more flexibly generated. In other words, the degree of freedom with which a desired pulse shape can be created is proportional to the number of available tones. The above process can be repeated until the magnitude of all the peaks becomes less than or equal to the threshold.

The PAPR reduction logic shown in FIG. 7 is a long loop scheme where peak cancellation is applied to the output signal of the digital upconverter 880 belonging to the digital unit and the peak canceled signal is fed back to the baseband modem (baseband processing unit). Alternatively, an over-sampling logic may be implemented directly in the baseband modem (baseband processing unit) prior to passing through the CPRI to the DUC, so that a peak cancellation signal or cancellation signal is generated within the baseband modem.

Figure 8A:
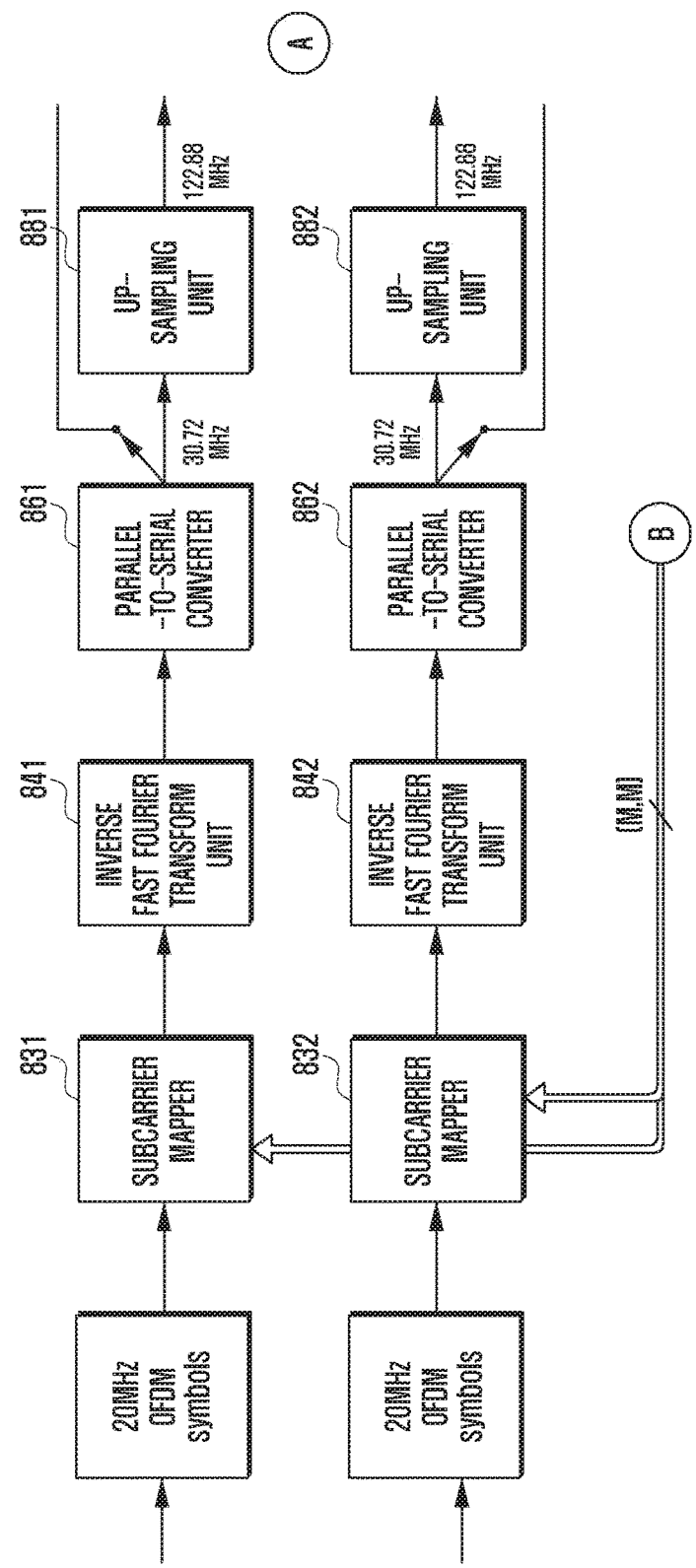
FIGS. 8A and 8B illustrate the configuration of an OFDM transmitter applying tone reservation in a multicarrier transmission system.
Figure 8B:
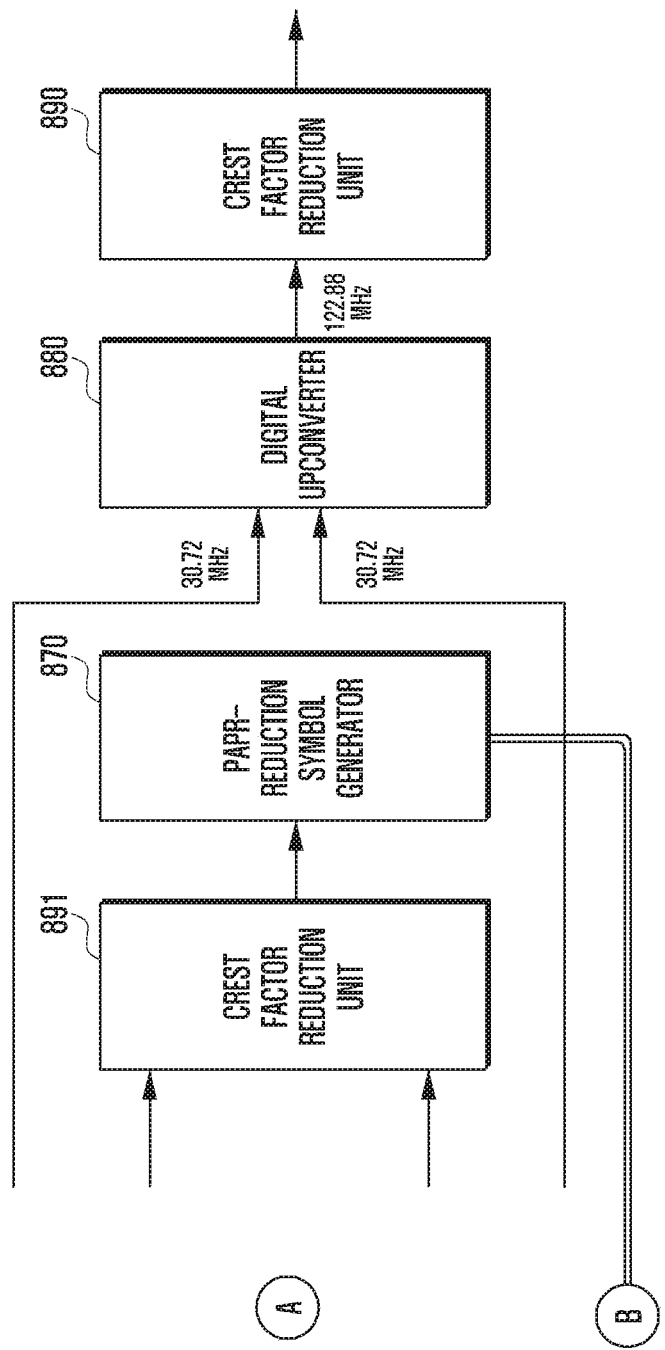

FIGS. 8A and 8B illustrate the configuration of an OFDM transmitter applying tone reservation in a multicarrier transmission system.

With reference to FIGS. 8A and 8B, the OFDM transmitter may be configured to include subcarrier mappers 831 and 832, inverse fast Fourier transform (IFFT) units 841 and 842, parallel-to-serial converters 861 and 862, up-sampling units 881 and 882, crest factor reduction (CFR) units 890 and 891, a PAPR-reduction symbol generator 870, and a digital upconverter (DUC) 880. The above units can perform the same functions as those of FIG. 7. When the OFDM transmitter of FIGS. 8A and 8B is divided into a baseband processing unit and a digital unit, the subcarrier mappers 831 and 832, the IFFT units 841 and 842, the parallel-to-serial converters 861 and 862, the up-sampling units 881 and 882, the crest factor reduction unit 891, and the PAPR-reduction symbol generator 870 may be included in the baseband processing unit, and the digital upconverter 880 and the crest factor reduction unit 890 may be included in the digital unit. Next, different functions from those of FIG. 7 will be described.

Compared with FIG. 7, in FIGS. 8A and 8B, the up-sampling units 881 and 882 and the crest factor reducing unit 891 are further included, and the PAPR-reduction symbol generator 870 is included in the baseband processing unit, not in the digital unit. Accordingly, the baseband processing unit combines the multicarrier signals at the up-sampled intermediate frequency internally, generates and applies an optimized tone-reserved signal at least once to lower the PAPR, and transmits the final baseband signal to the external hardware (digital unit) through the CPRI. That is, the OFDM transmitter of FIGS. 8A and 8B performs upconversion and PAPR-reduction symbol generation within the baseband processing unit, thereby reducing the amount of data transmitted through the CPRI in comparison to the OFDM transmitter of FIG. 7. As the PAPR-reduction symbol generator 870 included in the baseband processing unit repeats the process of transmitting a pulse filter (cancellation pulse) to the subcarrier mapper through a PAPR-reduced symbol, when the PAPR of the carrier signals combined in the intermediate frequency band after upsampling becomes less than or equal to the threshold, the parallel-to-serial converter 861 and 862 transmit their output signals to the digital upconverter 880 instead of the up-sampling units 881 and 882.

In the multicarrier systems of FIG. 7 and FIGS. 8A and 8B, a rectangular signal in the frequency domain can be used as a cancellation pulse (PAPR rejection signal). In FIG. 7 and FIGS. 8A and 8B, two carrier signals are shown for ease of description. However, the present invention is not limited thereto and can be applied to a larger number of carrier signals.

In the above description, it is described that the PAPR reduction algorithm is repeated until all the peaks become less than or equal to the threshold. However, the present invention is not limited thereto. For example, the PAPR reduction algorithm may be repeated until the number of peaks greater than the threshold is less than or equal to a given number, or may be repeated a preset number of times.

Figure 9:
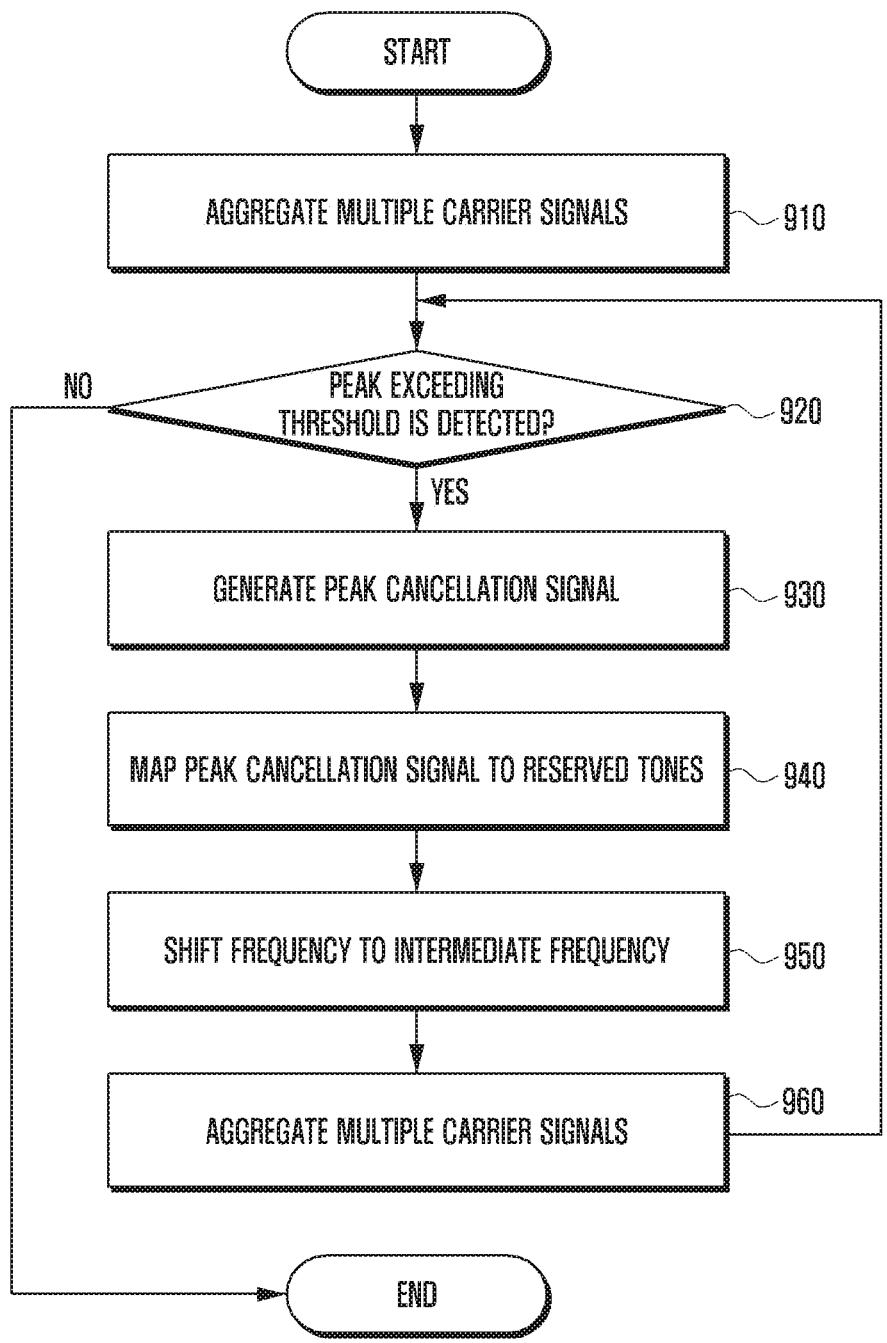
FIG. 9 describes a power control method of the transmitter in a multicarrier system.

FIG. 9 describes a power control method of the transmitter in a multicarrier system.

At step 910, the transmitter aggregates a plurality of up-sampled carrier signals. For example, this may correspond to aggregation of output signals of the parallel-to-serial converters 761 and 762 of FIG. 7 or the parallel-to-serial converters 861 and 862 of FIG. 8. The transmitter is an apparatus for transmitting and receiving signals to and from another apparatus, and may be, for example, an OFDM transmitter. The multiple up-sampled carrier signals may correspond to a signal with an intermediate frequency in a superheterodyne transmission scheme.

At step 920, the transmitter determines whether at least one peak exceeding a preset threshold is present among the peaks of the aggregated carrier signal. For example, the crest factor reduction unit 790 of FIG. 7 or the crest factor reduction unit 891 of FIG. 8 may detect one or more peaks exceeding the preset threshold.

Upon determining that at least one peak exceeding the threshold is present among the peaks of the aggregated carrier signal, at step 930, the transmitter generates a peak cancellation signal to cancel the detected at least one peak. For example, the PAPR-reduction symbol generator 770 of FIG. 7 or the PAPR-reduction symbol generator 870 of FIG. 8 may generate a peak cancellation signal. To generate a peak cancellation signal, it is possible to consider the difference between the peak to be cancelled and the preset threshold and the phase of the peak to be cancelled. When multiple peak cancellation signals are generated, each peak cancellation signal may have one or more corresponding peaks.

Upon determining that no peak exceeding the threshold is present among the peaks of the aggregated carrier signal, the transmitter ends the peak cancellation procedure without generating a peak cancellation signal. This may correspond to upconversion of the aggregated carrier signal by the digital upconverter 880 in FIG. 8, or correspond to conversion of the aggregated carrier signal into an analog signal by the digital-to-analog converter in FIG. 7.

At step 940, the transmitter maps the one or more peak cancellation signals to reserved subcarriers (tones). For example, the subcarrier mappers 731 and 732 of FIG. 7 or the subcarrier mappers 831 and 832 of FIG. 8 may map peak cancellation signals. The reserved subcarriers may include one or more preset subcarriers. The reserved subcarriers may be arranged within a given frequency band as shown in FIG. 3.

The carrier signal including the reserved subcarriers is a baseband signal. At step 950, the transmitter upconverts the multiple carrier signals including the reserved subcarriers (tones) respectively into intermediate frequencies. At step 960, the transmitter aggregates the frequency-shifted multiple carrier signals. Thereafter, the procedure returns to step 920, at which the transmitter determines whether at least one peak exceeding the threshold is present among the peaks of the aggregated carrier signal.

If at least one peak exceeding the threshold is present or detected, steps 930 to 960 are repeated. When the signal generated at step 910 is referred to as a first aggregated carrier signal, the signal newly generated at step 960 by repetition may be referred to as a second aggregated carrier signal, a third aggregated carrier signal, and the like. The peak cancellation signal newly generated at step 930 by repetition may be referred to as a first peak cancellation signal, a second peak cancellation signal, and the like. In another embodiment of the present invention, the repetition may be implemented so as not to exceed a preset number. That is, if steps 930 through 960 are repeated a predetermined number of times, the peak cancellation procedure may be terminated without determining whether at least one peak exceeding the threshold is present among the peaks of the combined carrier signal.

Figure 10:
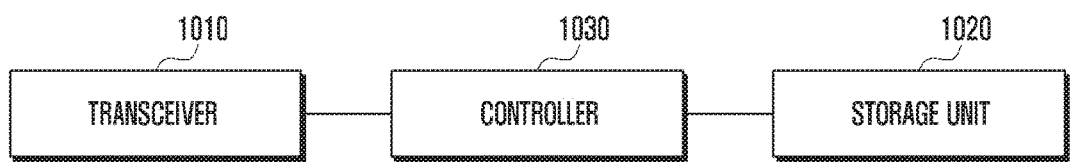
FIG. 10 illustrates the configuration of an apparatus for signal transmission and reception in a multicarrier system.

FIG. 10 illustrates the configuration of an apparatus for signal transmission and reception in a multicarrier system.

With reference to FIG. 10, the apparatus may be configured to include a communication unit 1010, a storage unit 1020, and a controller 1030. The apparatus may be an OFDM transmitter.

The communication unit 1010 may transmit and receive signals to and from another network device (e.g., base station or terminal). The signals transmitted and received may correspond to, for example, a multicarrier signal.

The storage unit 1020 may store information collected by the apparatus. The storage unit 1020 may store, for example, one or more peak cancellation signals. The peak cancellation signal may be stored such that it is matched with information related to the peak (e.g. difference between the peak and the threshold, phase of the peak).

The controller 1030 controls the overall state and operation of the components constituting the apparatus. The controller 1030 may control the storage unit 1020 to store the information received through the communication unit 1010. The control unit 1030 may control the other components to carry out various embodiments described in the present invention.

In FIG. 10, the communication unit 1010, the storage unit 1020, and the controller 1030 are depicted as being separate blocks with different functions. However, this is for ease of description only, and the functions are not necessarily distinguished in such a manner. In addition, the apparatus of FIG. 10 may further include an input unit to receive user input.

In the above-described embodiments, each step may be selectively performed or may be omitted. Also, steps in the embodiments need not occur in order, but may be reversed. The embodiments of the present invention disclosed in the specification and drawings are illustrative examples for understanding the present invention and are not intended to limit the scope of the present invention as defined in the appended claims and their equivalents.

The invention claimed is:

1. A method of power control for a transmitter in a multicarrier system, the method comprising:
   generating an aggregated carrier signal by aggregating multiple carrier signals;
   determining whether at least one peak exceeding a preset threshold is detected among the peaks of the aggregated carrier signal;
   generating, if at least one peak exceeding the preset threshold is detected, at least one cancellation signal based on the detected at least one peak; and
   mapping the at least one cancellation signal to reserved subcarriers,
   wherein frequencies of the multiple carrier signals are in an intermediate frequency band.

2. The method of claim 1, wherein generating at least one cancellation signal comprises generating at least one cancellation signal based on the difference between the detected at least one peak and the threshold, and the phase of the detected at least one peak.

3. The method of claim 1, wherein the reserved subcarriers are one or more subcarriers determined in advance.

4. The method of claim 1, further comprising:
   generating the multiple carrier signals by upconverting frequencies of data signals to the intermediate frequency band.

5. The method of claim 1, wherein the reserved subcarriers are in a given frequency band.

6. The method of claim 1, wherein the at least one cancellation signal corresponds to at least one position of the detected at least one peak.

7. The method of claim 1, further comprising:
   generating the multiple carrier signals by upsampling data signals including the reserved subcarriers into the intermediate frequency band using a superheterodyne transmission scheme.

8. The method of claim 7, further comprising:
   upconverting frequencies of the data signals for transmission, if no peak exceeding the threshold is detected among the peaks of the aggregated carrier signal.

9. The method of claim 1, further comprising converting the aggregated carrier signal into an analog signal if no peak exceeding the threshold is detected among the peaks of the aggregated carrier signal.

10. An apparatus for transmitting and receiving signals in a multicarrier system, comprising:
    a transceiver configured to transmit and receive signals to and from a device; and
    a controller configured to:
       generate an aggregated carrier signal by aggregating multiple carrier signals,
       determine whether at least one peak exceeding a preset threshold is detected among the peaks of the aggregated carrier signal,
       generate, if at least one peak exceeding the preset threshold is detected, at least one cancellation signal based on the detected at least one peak, and
       map the at least one cancellation signal to reserved subcarriers,
    wherein frequencies of the multiple carrier signals are in an intermediate frequency band.

11. The apparatus of claim 10, wherein the controller generates at least one cancellation signal based on the difference between the detected at least one peak and the threshold, and the phase of the detected at least one peak.

12. The apparatus of claim 10, wherein the reserved subcarriers are one or more subcarriers determined in advance.

13. The apparatus of claim 10, wherein the controller is further configured to generate the multiple carrier signals by upconverting frequencies of data signals to the intermediate frequency band.

14. The apparatus of claim 10, wherein the reserved subcarriers are in a given frequency band.

15. The apparatus of claim 10, wherein the at least one cancellation signal corresponds to at least one position of the detected at least one peak.

16. The apparatus of claim 10, wherein the controller configured to generate the multiple carrier signals by upsampling data signals including the reserved subcarriers into the intermediate frequency band using a superheterodyne transmission scheme.

17. The apparatus of claim 16, wherein the controller is further configured to upconvert frequencies of the data signals for transmission, if no peak exceeding the threshold is detected among the peaks of the aggregated carrier signal.

18. The apparatus of claim 10, wherein the controller is further configured to convert the aggregated carrier signal into an analog signal if no peak exceeding the threshold is detected among the peaks of the aggregated carrier signal.

19. The apparatus of claim 10, wherein the apparatus is an orthogonal frequency division multiplexing (OFDM) transmitter.

* * * * *